No. 766,401. PATENTED AUG. 2, 1904.
R. C. TALLY.
STALK CUTTER.
APPLICATION FILED DEC. 8, 1903.
NO MODEL. 2 SHEETS—SHEET 1.
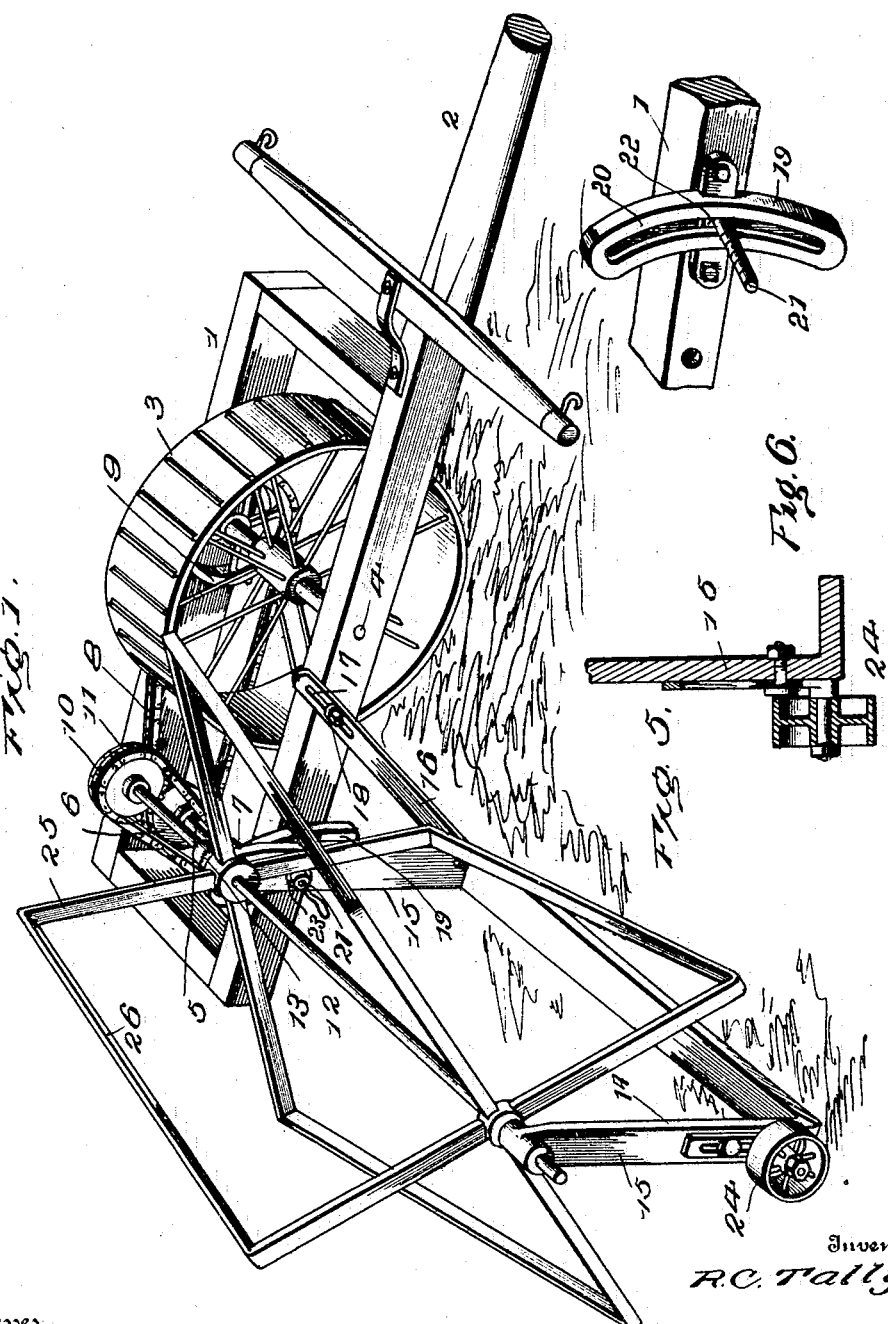
Witnesses
Inventor
R. C. Tally.
By R. S. & A. B. Lacey, his Attorneys

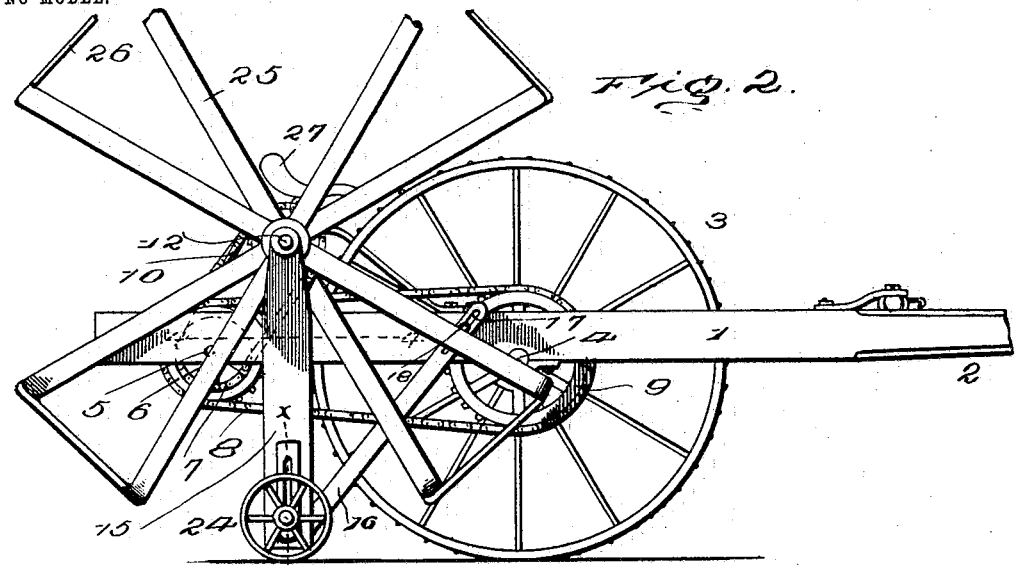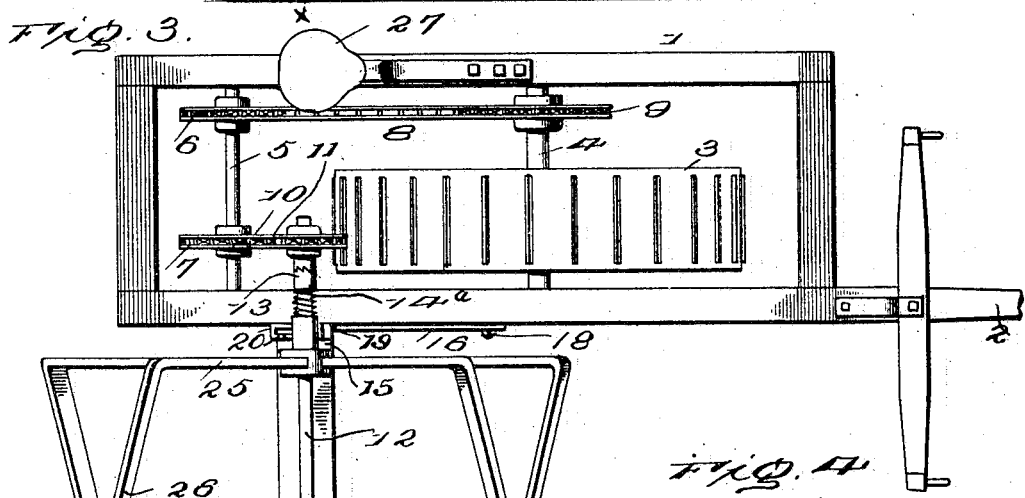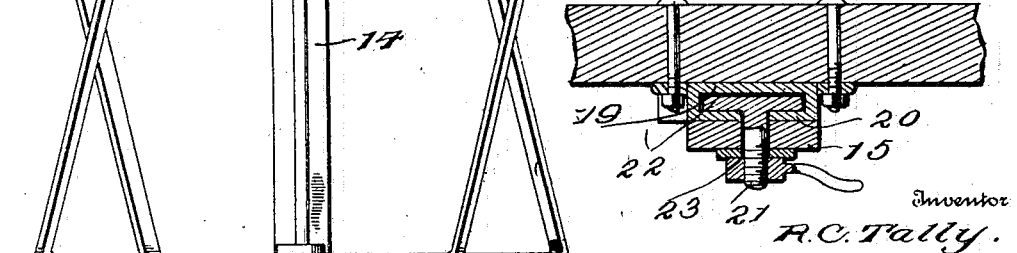

No. 766,401. Patented August 2, 1904.

UNITED STATES PATENT OFFICE.

RICHARD C. TALLY, OF NATHAN, TEXAS.

STALK-CUTTER.

SPECIFICATION forming part of Letters Patent No. 766,401, dated August 2, 1904.

Application filed December 8, 1903. Serial No. 184,312. (No model.)

*To all whom it may concern:*

Be it known that I, RICHARD C. TALLY, a citizen of the United States, residing at Nathan, in the county of Johnson and State of Texas, have invented certain new and useful Improvements in Stalk-Cutters, of which the following is a specification.

This invention relates to agricultural implements, and most especially to machinery for cutting stalks, the essential feature being the provision of cutting mechanism which is vertically adjustable to cut the stalks about on a level with the ground or at any distance thereabove as may be required.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a stalk-cutter embodying the invention. Fig. 2 is a side view thereof. Fig. 3 is a top plan view of the implement. Fig. 4 is a section on the line 4 4 of Fig. 2 of the arcuate guide, showing the means for securing the frame of the cutting mechanism at the required position. Fig. 5 is a detail view on the line X X of Fig. 2, showing the means for securing the supporting-wheel to the outer end of the frame at the required adjusted position. Fig. 6 is a detail view showing more clearly the arcuate guide or standard for connecting the frame of the reel to the main frame.

Corresponding and like parts are referred to in the following description and indicated in all the views of the drawings by the same reference characters.

The frame of the machine is indicated at 1, and the pole or tongue 2 projects forward therefrom in line with the side bar and is provided with the usual appurtenances for hitching the team thereto. The ground-wheel 3 is secured to the axle 4, so as to rotate therewith. The shaft 5 is journaled to the side bars of the frame 1, parallel with the axle 4, and is provided with sprocket-gears 6 and 7. A sprocket-chain 8 connects the sprocket-wheel 6 with the sprocket-wheel 9, secured to the axle 4. A sprocket-chain 10 connects the sprocket-wheel 7 with the sprocket-wheel 11, loose upon the inner end of the reel-shaft 12. The sprocket-wheel 11 is provided upon its inner side with a half-clutch which coöperates with a corresponding half-clutch 13, movable on the shaft 12, yet mounted so as to rotate therewith. The spring 14ª, mounted upon the shaft 12, normally presses the half-clutch 13 into engagement with the half-clutch of the sprocket-gear 11, so as to cause the parts to rotate forward when the machine is drawn over the ground.

The frame 14, supporting the cutting-reel, is approximately of U form and comprises a horizontal bar and uprights 15, the latter provided at their upper ends with bearings to receive the shaft 12. The frame 14 is adjustable vertically to regulate the height of the cut above the ground and is strengthened by means of the brace 16, which is pivotally connected at its lower rear end to the inner upright 15 and is longitudinally slotted at its upper end, as shown at 17, to receive the bolt 18, by means of which the brace is adjustably connected to the subjacent side of the frame 1. In order that the tension upon the sprocket-chain or drive-belt 10 may not be materially affected by the vertical adjustment of the frame 14, the latter is moved on the arc of a circle concentric with the shaft 5.

For securing the frame 14 in the adjusted position the following means have been devised and consist of the guide 19, which is of arcuate form and bolted or otherwise securely fastened to a side bar of the frame 1, so as to be concentric with the shaft 5. This guide 19 is an iron or casting of substantial formation and comprises a base-piece and overhanging flanges 20, which have their edge portions spaced apart a distance to receive the bolt or threaded stem 21, connected at its inner end to the block or plate 22, slidable freely in the space of the guide. The stem or fastening 21 passes through an opening of the inner upright 15 and receives upon its projecting end the hand-nut 23, by means of which the parts are secured after the frame has been adjusted to the required position, the flanges 20 being clamped between the plate 22 and the upright 15. When adjusting the cutting apparatus vertically, the clamp-nuts of the fastenings 18 and 21 are loosened, thereby permitting the frame and brace 16 to adapt themselves to the vertical movement of the frame 14, while at the same time admitting of said frame remaining parallel to a given position or to occupy a perpendicular position when finally adjusted. After the cutting mechanism has been adjusted it is made secure by retightening the clamp-nuts previously loosened. The supporting-wheel 24 at the outer end of the frame 14 is vertically adjustable, so as to travel upon the ground and support the outer end of the frame 14 when moved to the required position.

The arms 25 of the reel are connected to the shaft in any substantial manner and support the traveling cutters 26, which connect the outer ends of corresponding arms and are arranged obliquely to the shaft, so as to coöperate with the stationary cutter-bar of the frame 14 by a draw-cut action in the manner well understood. The lower horizontal bar of the frame 14 is sharpened at its front edge or may be provided with a cutter of any form, and the edges of the bars 26, coöperating with the stationary cutter, are correspondingly sharpened, so as to insure a cutting of the stalks with a minimum expenditure of force.

A machine constructed substantially as herein disclosed is drawn over the field, and for convenience of the driver a seat 27 is provided and conveniently located upon the frame 1. As the machine moves forward motion is transmitted from the drive-wheel 3 to the cutting-reel by means of the gearing illustrated, and in order to prevent injury to the reel by backward movement of the machine the clutch mechanism herein referred to has been provided and interposed between the reel-shaft and the sprocket-wheel 11.

Having thus described the invention, what is claimed as new is—

1. In a stalk-cutter, the combination of the frame, a shaft, as 5, journaled to the frame and adapted to have motion imparted thereto from the drive-wheel, a cutting mechanism comprising a frame and reel, means for transmitting motion from said shaft 5 to the shaft of the cutting-reel, and means for vertically adjusting the cutting mechanism in a curved path concentric with the said shaft 5, said means comprising an arcuate guide, a plate coöperating therewith, and securing means between said plate and frame of the cutting mechanism, substantially as set forth.

2. In a stalk-cutter, the combination of a frame, a supporting-wheel therefor, a shaft, as 5, journaled to the frame and adapted to receive motion from the drive-wheel, a cutting mechanism comprising a frame, a reel, means for transmitting motion from the shaft 5 to the shaft of the reel, a guide, a plate adjustable in said guide, means pivotally connecting the frame to the plate and securing said plate and frame to the guide in an adjusted position, a brace pivoted at one end to the lower portion of the frame, and means adjustably connecting the opposite end of the brace to the main frame of the machine, substantially as specified.

3. In combination, the main frame, a supporting-wheel therefor, a shaft, as 5, journaled to the frame and connected with the supporting-wheel to receive motion therefrom, a vertically-adjustable frame, a cutting-reel journaled to the frame, a sprocket-gear loose upon the shaft of the reel and geared to the shaft 5, a clutch between the reel-shaft and the sprocket-gear loosely mounted thereon, a supporting-wheel at the outer end of the frame vertically adjustable, a brace pivoted to the adjustable frame at one end, means for adjustably connecting the brace to the main frame at the opposite end, an arcuate guide secured to the main frame, a plate adjustable with reference to said guide and pivotally supporting the adjustable frame, and means for securing the plate and adjustable frame to the guide, substantially as set forth.

In testimony whereof I affix my signature in presence of two witnesses.

RICHARD C. TALLY. [L. S.]

Witnesses:
 E. W. LYNN,
 J. W. CHAPMAN.